(12) United States Patent
Campagna et al.

(10) Patent No.: US 10,557,433 B2
(45) Date of Patent: Feb. 11, 2020

(54) SYSTEM AND METHOD FOR DETECTING A FAULT CONDITION ASSOCIATED WITH A VALVETRAIN OF AN ENGINE

(71) Applicant: Caterpillar Inc., Peoria, IL (US)

(72) Inventors: Michael Campagna, Chillicothe, IL (US); Andrew Billing, Bloomington, IL (US); Dereck Heffron, Peoria, IL (US); Brian Wheeler, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 547 days.

(21) Appl. No.: 15/369,114

(22) Filed: Dec. 5, 2016

(65) Prior Publication Data
US 2018/0156149 A1    Jun. 7, 2018

(51) Int. Cl.
*G01M 15/05* (2006.01)
*F02D 41/22* (2006.01)

(52) U.S. Cl.
CPC ............. *F02D 41/22* (2013.01); *G01M 15/05* (2013.01)

(58) Field of Classification Search
CPC .... F02D 35/023; F02D 41/0082; F02D 41/22; F02D 41/221; F02D 41/222; G01M 15/05; G01M 15/08; G01M 15/09; G01M 15/044; G01M 15/048; G01M 15/10; G01M 15/102; G01M 15/106; G01M 3/2815
See application file for complete search history.

(56) References Cited

U.S. PATENT DOCUMENTS

| 5,361,628 | A | * | 11/1994 | Marko | F02D 41/22 706/913 |
| 6,092,016 | A | * | 7/2000 | Sarangapani | F02B 75/22 123/676 |
| 6,101,442 | A | | 8/2000 | Lewandowski et al. | |
| 6,112,150 | A | | 8/2000 | Irons et al. | |
| 6,999,868 | B2 | | 2/2006 | Funke et al. | |
| 7,277,789 | B1 | | 10/2007 | Gibson et al. | |
| 7,439,700 | B2 | | 10/2008 | Shimojo et al. | |
| 7,761,217 | B2 | | 7/2010 | Waters et al. | |
| 2008/0148827 | A1 | * | 6/2008 | Keski-Hynnila | G01M 15/05 73/114.31 |

FOREIGN PATENT DOCUMENTS

JP        2007262895    * 10/2007

* cited by examiner

*Primary Examiner* — Mohamed Charioui
*Assistant Examiner* — Christine Y Liao
(74) *Attorney, Agent, or Firm* — Harrity & Harrity LLP

(57) ABSTRACT

A system for detecting a fault condition in a valvetrain of an engine is configured to measure one or more operating parameters associated with the engine and determine if the operating parameters satisfy pre-defined corresponding boundary conditions. If so, a pair of values of at least one performance parameter is measured corresponding to measurement on a first and second bank of cylinders present on the engine. The difference between the pair of values is determined and used to compute at least one measure of variation for the at least one performance parameter in a time segment. If the at least one measure of variation for the at least one performance parameter exceeds a pre-defined limit for the engine, the valvetrain is flagged as faulty.

20 Claims, 5 Drawing Sheets

SYSTEM AND METHOD FOR DETECTING A FAULT CONDITION ASSOCIATED WITH A VALVETRAIN OF AN ENGINE

TECHNICAL FIELD

The present disclosure generally relates to a system for monitoring performance of a valvetrain of an engine. More particularly, the present disclosure relates to a system for detecting a fault condition in the valvetrain of an engine.

BACKGROUND

Engines have valvetrain assemblies that may develop failures or faults from time to time. Reliable and timely detection of such fault conditions associated with the valvetrain is desirable. U.S. Pat. No. 6,101,442 (hereinafter referred to as 'the '442 patent') discloses a method for detecting a valve-related fault condition in an internal combustion engine. The system of the '442 patent utilizes the intake air temperatures at each of a plurality of cylinder sections of the engine. A difference between successive air temperatures for each cylinder section present on the engine is determined and compared with an average value of the intake air temperatures taken at the plurality of cylinder sections to determine a rate of change occurring in the intake air temperature for each cylinder section. This rate of change is then compared to an empirically calculated threshold value to determine if a valve-related fault condition has occurred. It should be evident that there is, however, a continued need for systems and methods that exhibit a high degree of accuracy and confidence in the detection of fault conditions in valvetrains of engines.

The present disclosure provides a system and a method to detect failures in a valvetrain of an engine with a high level of reliability.

SUMMARY OF THE DISCLOSURE

In one aspect of this disclosure, a fault detection system for a valvetrain of an engine is disclosed. The engine includes a first bank of cylinders and a second bank of cylinders, and a first plurality of sensors that are disposed on the engine. The first plurality of sensors are configured to measure one or more operating parameters of the engine. The fault detection system further includes a second plurality of sensors disposed on the engine. The second plurality of sensors are configured to measure at least one performance parameter associated with the engine in which the measurement of the at least one performance parameter by the second plurality of sensors at any given instant of time includes measuring one value from each of the first bank of cylinders and second bank of cylinders respectively.

The fault detection system further includes a processor that is communicably coupled to the first plurality of sensors and the second plurality of sensors. The processor is configured to determine if the one or more operating parameters satisfy one or more pre-defined corresponding boundary conditions for the engine. If so, the processor is configured to determine a difference in magnitude of the pair of values for the at least one performance parameter. The processor is then configured to compute at least one measure of variation for the at least one performance parameter in a time segment using the difference in the magnitude of the pair of values for the at least one performance parameter. The processor is then configured to determine if the at least one measure of variation exceeds a pre-defined limit for the engine. The processor is also configured to determine if the measure of variation persists above the pre-defined limit for the engine for at least a pre-defined period of time and if so, the processor is configured to flag the valvetrain as being faulty.

In another aspect of the present disclosure, a method for detecting a fault condition of a valvetrain in an engine includes measuring one or more operating parameters associated with the engine and determining if the one or more operating parameters satisfy one or more pre-defined corresponding boundary conditions for the engine. If so, the method includes measuring at least one performance parameter associated with the engine in which the at least one performance parameter includes a pair of values corresponding with respective ones of the first and second banks of cylinders present on the engine.

The method further includes determining a difference in magnitude of the pair of values for the at least one performance parameter, and computing at least one measure of variation for the at least one performance parameter in a time segment using the difference in the magnitude of the pair of values for the at least one performance parameter. The method then includes determining if the measure of variation for the at least one performance parameter exceeds a pre-defined standard deviation limit for the engine. The method also includes determining if the measure of variation persists above the pre-defined standard deviation limit for at least a pre-defined period of time and if so, the method includes flagging the valvetrain as faulty.

Aspects of the present disclosure are also directed to an engine system having an engine and employing the fault detection system disclosed herein for detecting a fault condition in a valvetrain of the engine.

Other features and aspects of this disclosure will be apparent from the following description and the accompanying drawings.

BRIEF DESCRIPTION OF THE DRAWINGS

The features and advantages of the present disclosure will become more apparent from the detailed description set forth below when taken in conjunction with the drawings.

DETAILED DESCRIPTION

Figure 1:
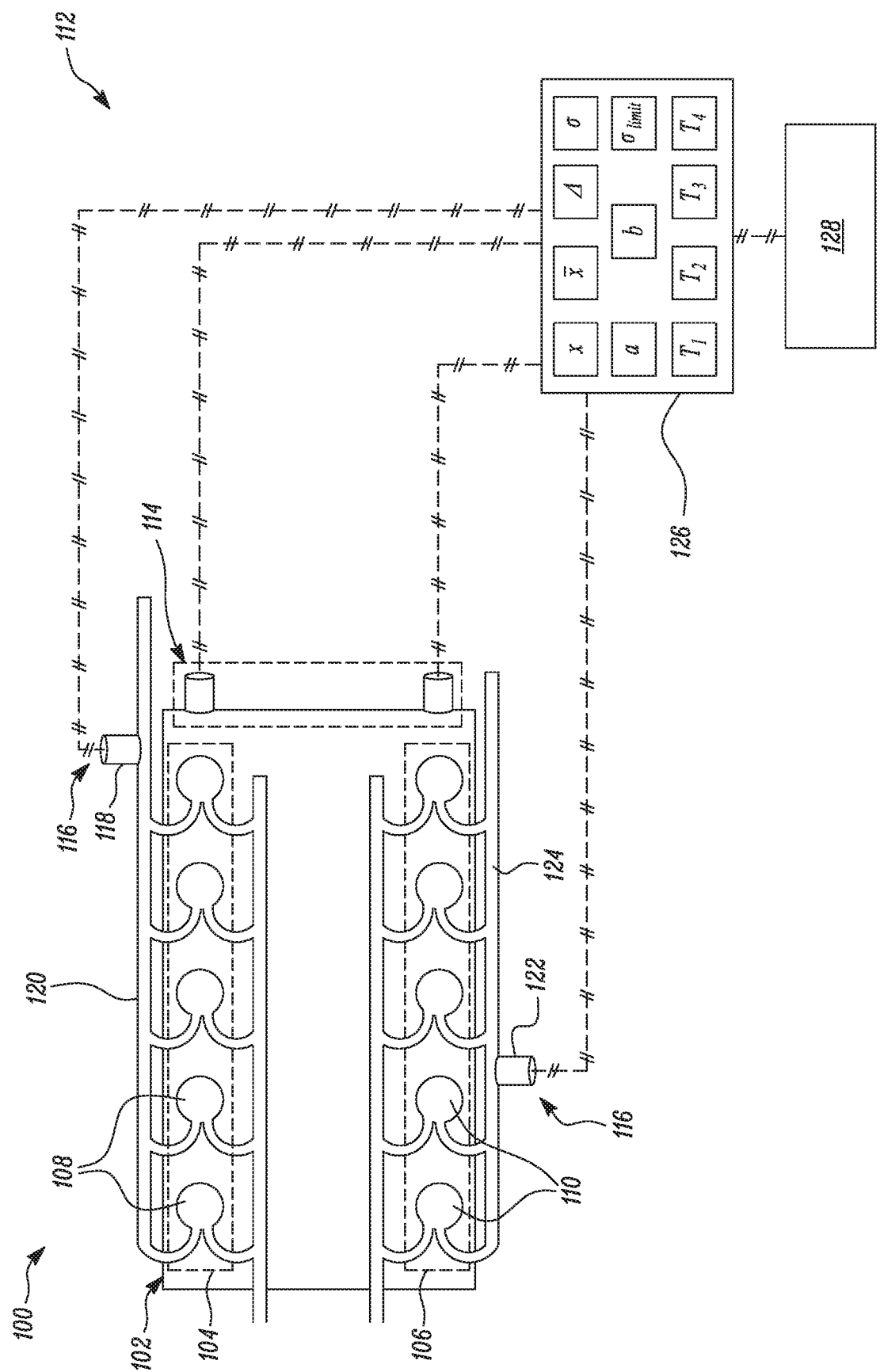
FIG. 1 is a schematic of an engine system showing an exemplary engine and a fault detection system that is configured to detect a fault condition associated with a valvetrain of the engine, in accordance with an embodiment of the present disclosure.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical changes may be made without departing from the spirit and scope of the disclosure. It will be apparent to a person skilled in the pertinent art that this disclosure can also be employed in a variety of other applications in which detection of a fault condition is required. Thus, the detailed description herein is presented for purposes of illustration only and not of limitation.

For the sake of brevity, conventional data networking, application development and other functional aspects of the systems (and components of the operating systems) may not be described in detail herein. Furthermore, the connecting lines shown in the various figures contained herein are intended to represent exemplary functional relationships and/or physical/communicative couplings between the various elements. It should be noted that many alternative or additional functional relationships or physical/communicative connections may be present in a practical system.

The present disclosure is described herein with reference to system architecture, block diagrams and flowchart illustrations of methods, and computer program products according to various aspects of the disclosure. It will be understood that each functional block of the block diagrams, the flowchart illustrations, and combinations of functional blocks in the block diagrams, the flowchart illustrations, and combinations of functional blocks in the block diagrams, respectively, can be implemented by computer program instructions.

These computer program instructions may be loaded onto a general purpose computer, special purpose computer, or other programmable data processing apparatus to produce a system, such that the instructions that execute on the computer-based system or other programmable data processing apparatus create means for implementing the functions specified in the flowchart block or blocks. These computer program instructions may also be stored in a computer-readable memory that can direct a computer-based system or other programmable data processing apparatus to function in a particular manner, such that the instructions stored in the computer-readable memory produce output/s that implement the function specified in the flowchart block or blocks. The computer program instructions may also be loaded onto a computer-based system or other equivalent programmable data processing apparatuses to cause a series of operational steps to be performed on the computer-based system or on the other programmable data processing apparatus to produce a computer-implemented method such that the instructions which execute on the computer-based system or on the other programmable data processing apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described as being combined into a single step for the sake of simplicity may be expanded into multiple steps. In other cases, steps illustrated and described as single process steps may be separated into multiple steps but have been combined for simplicity.

It may be further noted that references in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

The systems, methods and computer program products disclosed in conjunction with various embodiments of the present disclosure are embodied in systems and methods for detecting a fault condition associated with a valvetrain of a multi-cylinder engine. Specific nomenclature used herein is merely exemplary and only used for descriptive purposes. Hence, such nomenclature must not be construed as being limiting of the scope of the present disclosure.

The present disclosure is now described in more detail herein in terms of the above disclosed exemplary embodiments of system, methods, processes and computer program products. This is for convenience only and is not intended to limit the application of the present disclosure. In fact, after reading the following description, it will be apparent to one skilled in the relevant art(s) how to implement the following disclosure in alternative embodiments.

With reference to FIG. 1, an exemplary engine system 100 is depicted, in accordance with embodiments of the present disclosure. As shown, the engine system 100 includes an engine 102. The engine 102 disclosed herein may be a spark-ignited (SI) engine or a compression-ignited (CI) engine. Moreover, as shown in the embodiment of FIG. 1, the engine 102 is exemplarily embodied in the form of a multi-cylinder engine. However, persons skilled in the art will appreciate that the present disclosure is similarly applicable in the case of a single cylinder engine.

With continued reference to FIG. 1, the engine 102 includes a first bank of cylinders 104 and a second bank of cylinders 106. As shown, the first bank of cylinders 104 may, at the least, contain one cylinder 108 therein. Likewise, the second bank of cylinders may, at the least, contain one cylinder 110 therein. However, in other embodiments of this disclosure, alternative configurations of the first and second cylinder banks 104, 106 can be contemplated in which more than one cylinder may be included in respective ones of the first and second banks of cylinders 104, 106. For example, as shown in FIG. 1, the first bank of cylinders 104 includes five cylinders 108 therein. Similarly, the second bank of cylinders 106 includes five cylinders 108 therein. However, it should be noted that embodiments of the present disclosure can be implemented for use with any configuration of respective ones of the first and second cylinder banks 104, 106 present in an engine.

The engine system 100 further includes a fault detection system 112 associated with the engine 102. As shown in FIG. 1, the fault detection system 112 includes a first plurality of sensors 114 disposed on the engine 102. The first plurality of sensors 114 are configured to measure one or more operating parameters of the engine 102. In embodiments of this disclosure, the one or more operating parameters measured by the first plurality of sensors 114 may include at least one of engine speed, engine load, engine throttle position, engine fuelling rate, and engine exhaust temperature.

The fault detection system 112 further includes a second plurality of sensors 116 disposed on the engine 102. The second plurality of sensors 116 are configured to measure at least one performance parameter associated with the engine 102. In embodiments of this disclosure, the at least one performance parameter may include at least one of cylinder bank inlet temperature, cylinder bank exhaust temperature, cylinder bank inlet manifold pressure, turbine outlet temperature, and crankcase pressure.

With regards to the measurement of the at least one performance parameter, it may be noted that the at least one performance parameter, when measured by the second plurality of sensors 116, includes a pair of values 'a', 'b' corresponding with respective ones of the first and second banks of cylinders 104, 106 present on the engine 102. For example, the second plurality of sensors 116 may include a first temperature sensor 118 configured to measure a temperature of the exhaust stream exiting the first cylinder bank 104 i.e., via a first cylinder bank exhaust manifold 120 shown in FIG. 1. Moreover, with regards to the foregoing example, the second plurality of sensors 116 could also include a second temperature sensor 122 that is configured to measure a temperature of the exhaust stream exiting the second cylinder bank 106 i.e., via a second cylinder bank exhaust manifold 124 shown in FIG. 1.

Although the foregoing example discloses that the second plurality of sensors 116 includes the first temperature sensor 118 and the second temperature sensor 122, it should be noted that other types of sensors may be implemented in case measurements are to be made for other performance parameters disclosed herein. Therefore, it is hereby envisioned that a type of sensor/s being used to implement respective ones of the first and second plurality of sensors 114, 116 is non-limiting of this disclosure. Rather, the type of sensor/s used to implement respective ones of the first and second plurality of sensors 114, 116 disclosed herein may depend on the type of operating parameter/s and performance parameter/s respectively for which measurements are to be carried out.

The fault detection system 112 further includes a processor 126 that is communicably coupled to the first and second plurality of sensors 114, 116. The processor 126 disclosed herein may embody a single microprocessor or multiple microprocessors that include components for performing functions consistent with the present disclosure. Numerous commercially available microprocessors can be configured to perform the functions of the processor 126 disclosed herein. It should be appreciated that the processor 126 could readily be embodied in a general purpose microprocessor capable of controlling numerous functions associated with the engine 102, the first plurality of sensors 114, and the second plurality of sensors 116. The processor 126 may also include a memory, a secondary storage device, and any other components for running an application. Various circuits may be associated with the processor 126 such as power supply circuitry, signal conditioning circuitry for e.g., an analog-to-digital converter circuitry, and other types of circuitry. Various routines, algorithms, and/or programs can be programmed within the processor 126 for execution thereof. Moreover, it should be noted that the processor 126 of the present disclosure may be a stand-alone processor or may be configured to co-operate with existing processor/s, for example, an electronic control module (ECM) (not shown) provided to the engine 102 to perform functions that are consistent with the present disclosure.

The processor 126 is configured to determine if the one or more operating parameters satisfy one or more corresponding pre-defined boundary conditions for the engine 102. It may be noted that the one or more pre-defined boundary conditions may vary from one engine to another depending on a type of engine, engine model, or an application with which the engine 102 is associated. For example, the pre-defined boundary conditions stipulated for an engine that is being used in a mining truck application may require that the engine exhaust temperature be greater than zero degree Celsius (° C.), engine fuelling be greater than 600 cubic millimeter ($mm^3$), and engine speed be between 1400 and 2000 revolutions per minute (RPM).

During operation of the engine system 100, if the processor 126 determines that the one or more operating parameters of the engine 102, as measured by the first plurality of sensors 114, satisfy corresponding pre-defined boundary conditions for the engine 102, then the processor 126 is configured to determine a difference 'x' in magnitude of the pair of values a, b for the at least one performance parameter measured by the second plurality of sensors 116.

In the foregoing example, if the processor 126 determines that the engine exhaust temperature is greater than zero degree Celsius (° C.), engine fuelling rate is greater than 600 cubic millimeter ($mm^3$), and engine speed is between 1400 and 2000 revolutions per minute (RPM), then the processor 126 is configured to determine a difference x in the magnitude between the exhaust temperatures associated with respective ones of the first and second cylinder banks 104, 106. Denoting the exhaust temperatures of the first cylinder bank 104, as measured by the first temperature sensor 118, over successive points in time by $a_0, a_1, a_2, a_3, \ldots, a_{n-1}$, and the exhaust temperatures of the second cylinder bank 106, as measured by the second temperature sensor 122, over successive points in time by $b_0, b_1, b_2, b_3, \ldots b_{n-1}$, then the respective instantaneous temperature differences $x_0, x_1, x_2, x_3, \ldots x_{n-1}$ between the exhaust temperature values $a_0, a_1, a_2, a_3, \ldots a_{n-1}$ and the exhaust temperature values $b_0, b_1, b_2, b_3, \ldots b_{n-1}$ may be given by equation 1 as follows:

$$x_0 = |a_0 - b_0|$$

$$x_1 = |a_1 - b_1|$$

$$x_2 = |a_2 - b_2|$$

$$\ldots$$

$$x_{n-1} = |a_{n-1} - b_{n-1}| \qquad \text{eq. 1.}$$

It may be noted that 'n' number of differences 'x' computed upon measurement of the performance parameter, i.e., the exhaust temperature values of the first and second cylinder banks 104, 106 by the processor 126, corresponds to a number of data points (i.e., a number of measured values from any one of the cylinder banks 104, 106) present in a total testing time period $T_1$. As such, the total testing time period $T_1$ being implemented by the processor 126 may be selected so as to advantageously provide for a sufficient amount of time for the detection of a fault condition associated with the engine 102, and more particularly, with a valvetrain (not shown) of the engine 102. For example, in one engine application, the processor 126 may implement a total testing time period $T_1$ of 10 minutes. In another engine application, the processor 126 may implement a total testing time period $T_1$ of 5 minutes. Therefore, it may be noted that the total testing time period $T_1$ being implemented by the processor 126 may vary from one application to another depending on specific requirements of an application.

Figure 2:
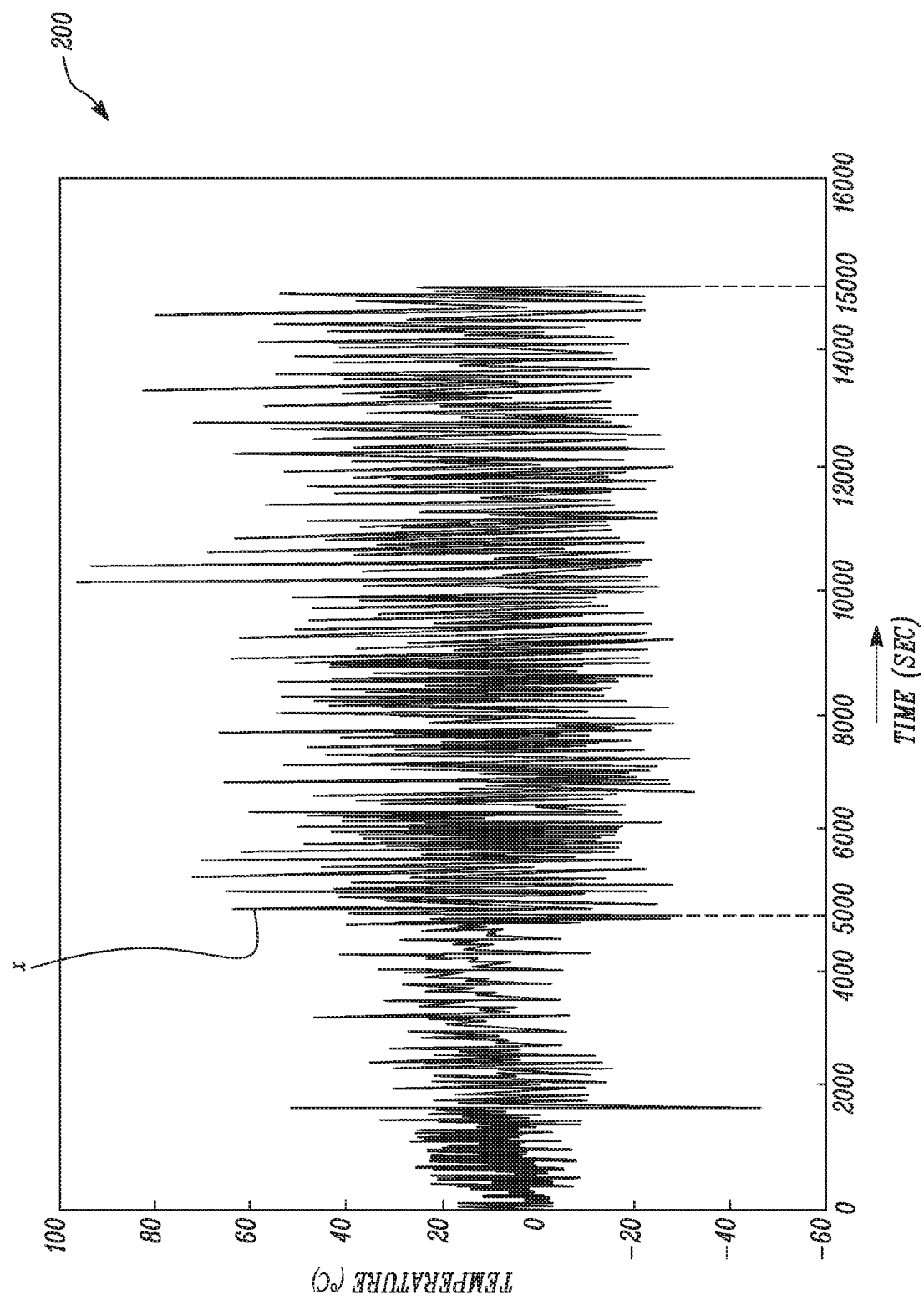
FIG. 2 is an exemplary graph showing a plot of the difference between a pair of exhaust temperature values corresponding to a pair of cylinder banks present on the engine with respect to time, in which a latter portion of the graph is representative of a fault condition of the valvetrain in accordance with embodiments of the present disclosure.

In the exemplary graphical representation 200 of FIG. 2, a variation in the difference x of exhaust temperatures (° C.) between the first and second cylinder banks 104, 106 is plotted against time (sec). As shown in FIG. 2, a small variation exists in the difference x present in a former portion of the graph 200 i.e., between zero and 5000 seconds, and a large variation exists in the latter portion of the graph 200 i.e., between 5000 seconds and 15,000 seconds which is indicative of a fault condition occurring in the valvetrain of the engine 102.

In one embodiment, the processor 126 disclosed herein is configured to compute at least one measure of variation for the at least one performance parameter in a time segment using the difference x in the magnitude of the pair of values for the at least one performance parameter. It is hereby noted that the at least one measure of variation includes at least one of a mathematical and statistical measure of variation. The terms 'mathematical' and 'statistical' disclosed herein have been used broadly and may be construed as being both—mutually inclusive and mutually exclusive of one another. As embodiments of the present disclosure are used to determine a fault condition of an engine for e.g., a fault condition of the engine 100 which is, by and large, an engineering application that can be realized using the embodiments of the present disclosure, the terms 'mathematical' and 'statistical' should be construed as being mutually inclusive of one another as will be evident in the context of the present disclosure.

In an embodiment, the measure of variation computed by the processor 126 may include a rolling standard deviation 'σ' over successive periods of time in the total testing time period $T_1$. Although a rolling standard deviation σ is disclosed herein, persons skilled in the art will acknowledge that other types of measurements of variation using the difference x may be implemented for computation by the processor 126 depending on specific requirements of an application. Therefore, it may be noted that the terms 'measure of variation' disclosed herein is not limited to the rolling standard deviation σ, rather, a scope of the terms 'measure of variation' can extend to include other modified mathematical or statistical methods of computation of variation using the difference x.

Figure 3:
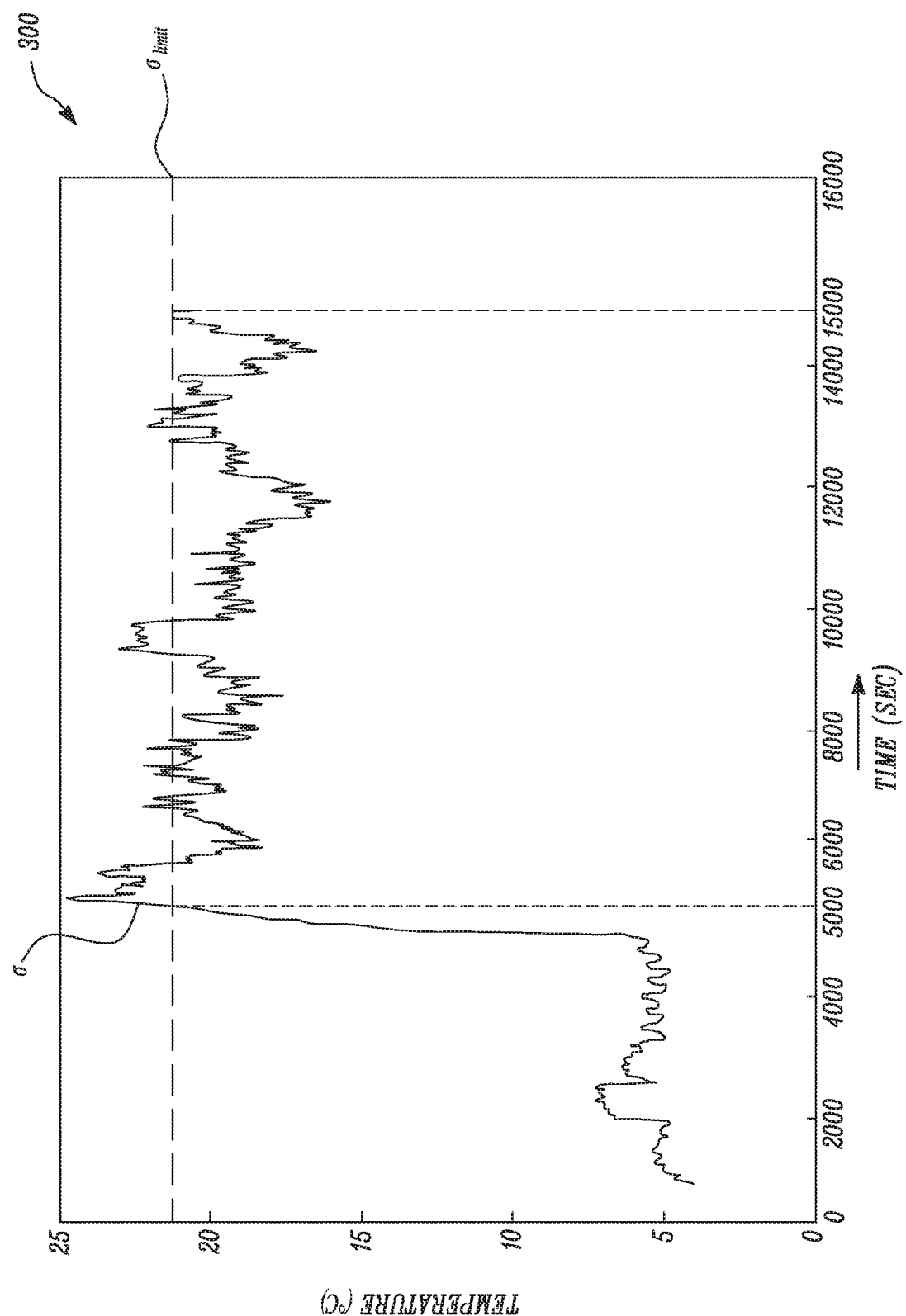
FIG. 3 is an exemplary graph showing a plot of rolling standard deviation computed using a difference between the pair of exhaust temperature values.

With regards to the aforesaid embodiment, the processor 126 may compute the rolling standard deviation σ using the difference x in the magnitude of the pair of values a, b for the at least one performance parameter over successive units of time in the period of total testing time $T_1$ which is plotted in the exemplary graphical representation 300 of FIG. 3. In an embodiment of this disclosure, the processor 126 is configured to compute the rolling standard deviation σ by determining an average '$\bar{x}$' of the difference x in the magnitude of the pair of values a, b. Moreover, the computation of the rolling standard deviation σ may be carried out by the processor 126 for a first pre-determined period of time $T_3$ that is well within a duration of time provided by the total testing time period $T_1$.

In an example, if the total testing time period $T_1$ is set to 10 minutes and a frequency of data cycles is 1 Hertz (Hz) i.e., 1 data point/second, a 30 second time period may be selected to implement the first pre-determined period of time $T_3$. Although a 30 second time period is disclosed herein for the first pre-determined period of time $T_3$, it may be noted that such time period is merely exemplary in nature and hence, non-limiting of this disclosure. If a narrower window of data points is desired in computing the average $\bar{x}$, then in another example, the first pre-determined period of time $T_3$ may be implemented by a 5 second time period. In yet another example, the first pre-determined period of time $T_3$ may be implemented by a 10 second time period, or a 15 second time period. Therefore, it may be noted that any amount of time may be implemented as the first pre-determined time period $T_3$ at the processor 126 depending on specific requirements of an application.

The first pre-determined period of time $T_3$ may consist of 'k' number of data points i.e., the number of differences x between the measured pairs of values a, b. As 'k' is a subset of 'n', it may be understood by persons skilled in the art that the number of data points present in the first pre-determined period of time $T_3$ would be less than the number of data points present in the total testing time period $T_1$ i.e., k<n.

Further, the first pre-determined period of time $T_3$ is also being implemented by way of a moving window that is shifted or moved incrementally by one data point each time. In relation to the foregoing example, the determination of a first average '$\bar{x}_0$' using the temperature differences $x_0, x_1, x_2, x_3, \ldots x_{n-1}$ for a window of size 'k' may be given by equation 2 as follows:

$$\bar{x}_0 = (\Sigma_{i=0}^{k-1} x_i)/k \qquad \text{eq. 2;}$$

wherein 'k' corresponds to the number of data points that are present in the first pre-determined period of time $T_3$.

Likewise, the processor 126 may determine a second average '$\bar{x}_1$' from the temperature differences $x_1, x_2, x_3, \ldots x_n$ by rolling the same window of size 'k' by one data point which is mathematically expressed by the below equation 3:

$$\bar{x}_1 = (\Sigma_{i=1}^{k} x_i)/k \qquad \text{eq. 3;}$$

Likewise, the processor 126 may be configured to determine a series of averages $\bar{x}$ corresponding to successive differences x in the magnitude of each pair of measured values a, b for the at least one operational parameter e.g., the exhaust temperatures from the first and second cylinder banks 104, 106 until the moving window of size 'k' reaches the last data point present in the total testing time period $T_1$. Therefore, it may be understood that the series of averages $\bar{x}$ is determined using the following equation 4:

$$\bar{x}_2 = \frac{\sum_{i=2}^{(k+1)} x_i}{k} \qquad \text{eq. 4}$$

$$\bar{x}_3 = \frac{\sum_{i=3}^{(k+2)} x_i}{k}$$

$$\vdots$$

$$\bar{x}_{n-k-1} = \frac{\sum_{i=(n-k-1)}^{(n-1)} x_i}{k}.$$

The processor 126 may be further configured to determine a difference 'Δ' between each pair of successive averages $\bar{x}$. The difference Δ between each pair of successive averages $\bar{x}$ may be given by equation 5 as follows:

$$\Delta_0 = |(\bar{x}_1 - \bar{x}_0)|$$

$$\Delta_1 = |(\bar{x}_2 - \bar{x}_1)|$$

$$\Delta_2 = |(\bar{x}_3 - \bar{x}_2)|$$

$$\Delta_{n-k-1} = |(\bar{x}_{n-k} - \bar{x}_{n-k-1})| \qquad \text{eq. 5.}$$

This way, the processor 126 is configured to compute the difference $\Delta$ for each pair of successive averages $\bar{x}$ until all the pairs of successive averages $\bar{x}$ have been exhausted from the total testing time period $T_1$.

Thereafter, the processor 126 may be configured to determine the rolling standard deviation $\sigma$ corresponding to the differences $\Delta$ determined between each pair of successive averages $\bar{x}$ in a second pre-determined period of time $T_4$. The number of data points i.e., number of averages $\bar{x}$ present in the second pre-determined period of time $T_4$ may be denoted by 'm'. It may be noted that the second pre-determined period of time $T_4$ is also implemented by way of another moving window whose size may be similar or dissimilar to the size 'k' of the moving window implemented for the computation of the averages $\bar{x}$. An example of a standard deviation $\sigma_0$ corresponding to the difference $\Delta_0$ between the first pair of successive averages $\bar{x}$ may be given by equation 6 as follows:

$$\sigma_0 = \frac{\sqrt{\sum_{i=0}^{m-1}((\Delta_i - \overline{\Delta_0})^2)}}{\sqrt{m}}; \qquad \text{eq. 6}$$

wherein $\overline{\Delta_0}$ is a first mean value of the averages $\bar{x}$ in the second pre-determined time period $T_4$.

Likewise, the processor 126 is configured to determine a series of standard deviations $\sigma_1, \sigma_2, \sigma_3, \sigma_4, \sigma_5 \ldots$ which for purposes of this disclosure should be regarded as the rolling standard deviation $\sigma$. However, it may also be noted that, the term 'rolling' being pre-fixed to the terms 'standard deviation' in the context of the present disclosure may be regarded as a series of standard deviations $\sigma_1, \sigma_2, \sigma_3, \sigma_4, \sigma_5 \ldots$ taken in a dynamic time segment which in the foregoing embodiment is provided by way of the moving window of size 'k'.

The rolling standard deviation $\sigma$ is therefore computed corresponding to the differences $\Delta$ between each pair of successive averages $\bar{x}$ in the second pre-determined period of time $T_4$ until the moving window of size 'k' reaches the last data point which in this case is the last average value i.e., $\bar{x}_{n-k-1}$ present in the total testing time period $T_1$. Therefore, it may be understood that the rolling standard deviation $\sigma$ is determined recurrently using the following equation 7:

$$\sigma_1 = \frac{\sqrt{\sum_{i=1}^{m}((\Delta_i - \overline{\Delta_1})^2)}}{\sqrt{m}} \qquad \text{eq. 7}$$

$$\sigma_2 = \frac{\sqrt{\sum_{i=2}^{m+1}((\Delta_i - \overline{\Delta_2})^2)}}{\sqrt{m}}$$

$$\vdots$$

$$\sigma_{n-k-m-1} = \frac{\sqrt{\sum_{i=(n-k-m-1)}^{n-k-2}((\Delta_i - \overline{\Delta_{(n-k-m-1)}})^2)}}{\sqrt{m}}.$$

Although the rolling standard deviation $\sigma$ is disclosed herein, in another embodiment of this disclosure, it can be contemplated to alternatively compute a simple standard deviation in lieu of the rolling standard deviation $\sigma$ disclosed in the foregoing embodiment. Such simple standard deviation may be computed using a static time segment i.e., a time segment in which no moving window exists. Moreover, it will be acknowledged by persons skilled in the art that a manner of computation of the simple standard deviation may entail that a single value of standard deviation is obtained by taking all the differences $\Delta$ between the successive pairs of averages $\bar{x}$ into consideration at once. Therefore, it is hereby contemplated that such simple standard deviation can also be regarded as another type of measurement of variation i.e., of a type other than the rolling standard deviation $\sigma$ disclosed herein.

The processor 126 is configured to determine if the computed measure of variation for the at least one performance parameter for e.g., the exhaust temperatures $a_0, a_1, a_2, a_3, \ldots a_{n-1}$, and $b_0, b_1, b_2, b_3, \ldots b_{n-1}$ from respective ones of the cylinder banks 104, 106 exceeds a pre-defined limit for the engine 102. With regards to the foregoing embodiment in which the rolling standard deviation $\sigma$ is computed, the processor 126 is configured to determine if the rolling standard deviation $\sigma$ exceeds a pre-defined standard deviation limit $\sigma_{limit}$ for the engine 102 (refer to FIG. 3). The pre-defined standard deviation limit $\sigma_{limit}$ disclosed herein is known before-hand for a given engine. In an example, the pre-defined standard deviation limit $\sigma_{limit}$ may be derived from empirical calculations, trial-runs, experimental data, lab simulations, historical data, statistical models, theoretical models, and the like depending upon various factors including, but not limited to, a given engine model, engine type, or a given application in which the engine is used. Alternatively, the pre-defined standard deviation limit $\sigma_{limit}$ could also be user-selected. In an example as shown in FIG. 3, the pre-defined standard deviation limit $\sigma_{limit}$ has been set to 21 standard deviations which, as shown in the exemplary graph 300 of FIG. 3, has been exceeded by the standard deviation curve $\sigma$ numerous times between 5,000 seconds and 15,000 seconds.

If the processor 126 determines that computed rolling standard deviation a exceeds the standard deviation limit $\sigma_{limit}$, then in a further embodiment of this disclosure, the processor 126 is configured to additionally determine if the rolling standard deviation $\sigma$ persists above the standard deviation limit $\sigma_{limit}$ for a pre-defined period of time $T_2$. If so, the processor 126 is configured to flag the valvetrain as being faulty. The pre-defined period of time $T_2$ disclosed herein may be user-selected. In an example shown in FIG. 3, if the pre-defined period of time $T_2$ is set to 2 minutes i.e., 120 seconds, then the processor 126 would flag the valvetrain as faulty at 5120 seconds into the total testing time period $T_1$ of 15000 seconds. However, in another example, the pre-defined period of time $T_2$ may be set to 1 minute. In yet another example, the pre-defined period of time $T_2$ may be set to 1 minute. It should be noted that the pre-defined period of time $T_2$ would be kept less than the total testing time period $T_1$ so that a detection of a fault in the engine 100, and in particular, the valvetrain of the engine 100 can be facilitated within the total testing time period $T_1$.

Also, it is hereby contemplated that the fault detection system 112 as shown in FIG. 1 may, additionally or optionally, include an indication device 128 that is disposed in communication with the processor 126. The indication device 128 is configured to output a warning signal when the processor 126 flags the valvetrain as faulty. The indication device 128 disclosed herein may be disposed on a machine (not shown) in which the engine system 100 is employed or at a remote operator station (not shown) as desired. The indication device 128 is configured to provide the warning signal e.g., an audio signal, a visual signal, or a haptic signal to prompt an operator for stopping and inspecting the fault condition associated with the engine 102, and more particularly, with the valvetrain of the engine 102 before operation can be resumed. This way, further deterioration in the performance of the valvetrain and/or the engine 102 may be prevented.

Although the foregoing disclosure is explained in conjunction with the pair of exhaust temperatures from respective ones of the first and second cylinder banks 104, 106, it may be noted that other performance parameters including, but not limited to, cylinder bank inlet temperature, cylinder bank inlet manifold pressure, turbine outlet temperature, and crankcase pressure may be used in lieu of or in addition to the exhaust temperatures of respective ones of the first and second cylinder banks 104, 106.

Further, it may also be appreciated by persons skilled in the art that with use of two or more performance parameters for e.g., cylinder bank exhaust temperature and cylinder bank inlet temperature, a determination of their respective measures of variations for e.g., respective rolling standard deviations $\sigma_{ex}$, $\sigma_{in}$ and the subsequent assessment from comparison with corresponding pre-defined limits for e.g., corresponding rolling standard deviation limits $\sigma_{exlimit}$, $\sigma_{inlimit}$ may serve to enhance a confidence level in the detection of the fault condition and therefore, help in improving an accuracy and reliability in the detection of the fault condition associated with the valvetrain. Accordingly, in an embodiment of this disclosure, it has been further contemplated that the processor 126 can be advantageously configured to compute more than one measure of variation i.e., for respective ones of multiple performance parameters, in a dynamic or static time segment using the difference x in the magnitude of the pair of values for respective ones of the performance parameters.

Furthermore, although the foregoing embodiments discloses one of the many possible approaches of performing a measure of variation i.e., by computing the rolling standard deviation $\sigma$, other conceptually similar approaches for computing a measure of variation would be known to persons skilled in the art and such conceptually similar approaches may be implemented in lieu of the rolling standard deviation $\sigma$ disclosed herein. Therefore, it may be noted that a manner of computing the rolling standard deviation $\sigma$ disclosed herein and the computation of the rolling standard deviation $\sigma$ in itself is merely exemplary in nature and should not be construed as being limiting of this disclosure.

In embodiments of the present disclosure, the processor 126 may be implemented using one or more physical computers, embedded devices, field programmable gate arrays (FPGAs), microcontrollers, or computer systems or portions thereof. The instructions executed by the processor 126 may also be read in from a computer-readable medium. The computer-readable medium may be non-transitory, such as a CD, DVD, optical or magnetic disk, laserdisc, flash memory, embedded memory within the processor 126 or any other medium that is readable by the processor 126. In some embodiments, hardwired circuitry may be used in place of or in combination with software instructions executed by the processor 126. Communication among modules, systems, devices, and elements may be over direct or switched connections, and wired or wireless networks or connections, via directly connected wires, or any other appropriate communication mechanism. Transmission of information may be performed on a hardware layer using any appropriate system, device, or protocol, including those related to or utilizing Firewire, PCI, PCI express, CardBus, USB, CAN, SCSI, IDA, RS232, RS422, RS485, 802.11, etc. The communication among modules, systems, devices, and elements forming the processor 126 of the present disclosure may include handshaking, notifications, coordination, encapsulation, encryption, headers, such as routing or error detecting headers, or any other appropriate communication protocol or attribute. Communication may also include messages related to HTTP, HTTPS, FTP, TCP, IP, ebMS OASIS/ebXML, DICOM, DICOS, secure sockets, VPN, encrypted or unencrypted pipes, MIME, SMTP, MIME Multipart/Related Content-type, SQL, etc.

One or more software elements may be loaded onto a general purpose computer, special purpose computer, or other programmable data processing apparatus to produce the processor 126, such that the instructions that execute on the computer or other programmable data processing apparatus create means for implementing the functions disclosed herein. These computer program instructions may also be stored in a computer-readable memory that can direct a computer or other programmable data processing apparatus to function in a particular manner, such that the instructions stored in the computer-readable memory produce instructions which implement the functions disclosed herein. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions disclosed herein.

Figure 4:
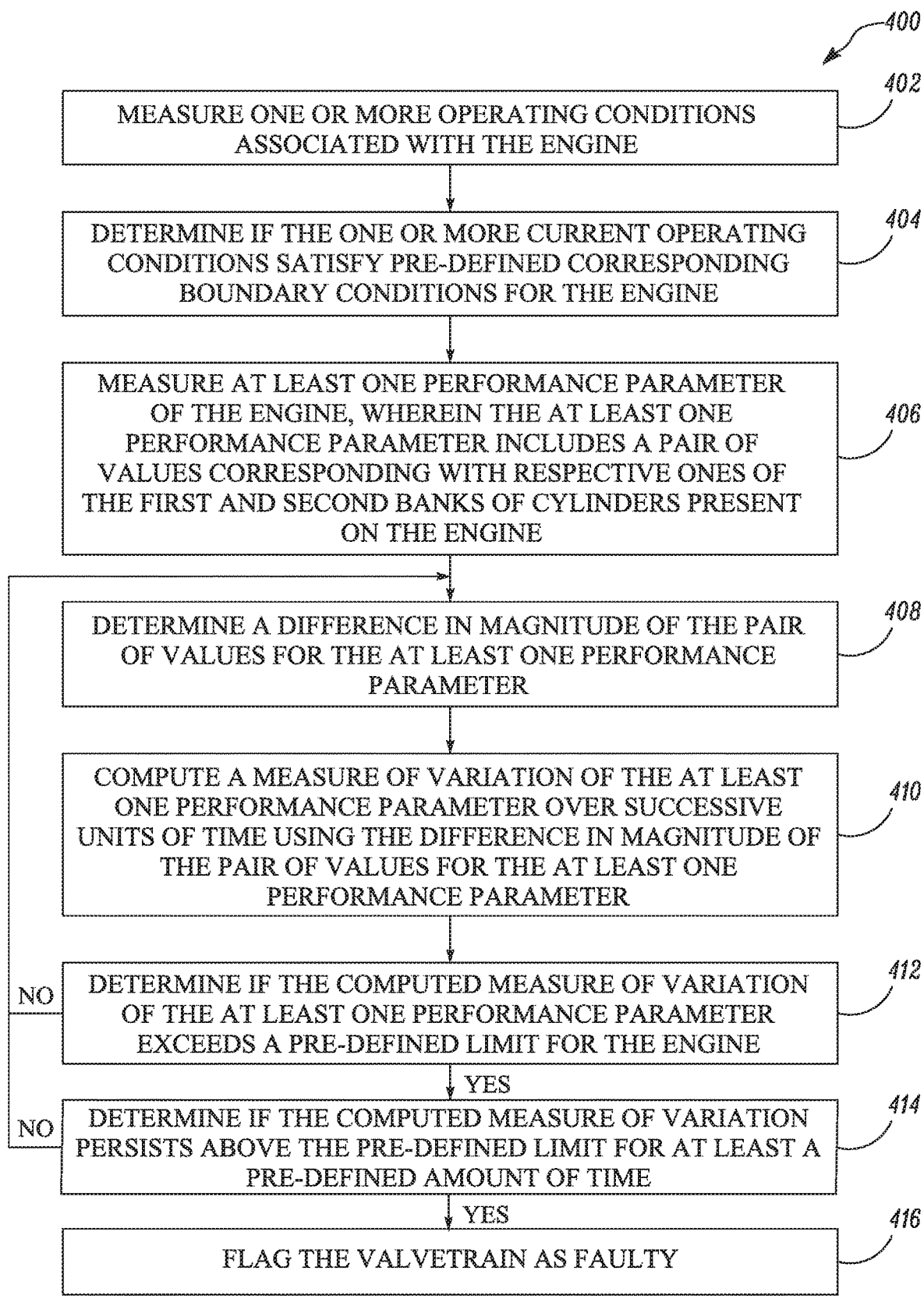
FIG. 4 is a flowchart depicting a method for detecting the fault condition associated with the valvetrain.

Referring to FIG. 4, a method 400 for detecting a fault condition in the valvetrain of the engine 102 is depicted. At step 402, the method 400 includes measuring one or more operating parameters associated with the engine 102. At step 404, the method 400 further includes determining if the one or more operating parameters satisfy one or more pre-defined corresponding boundary conditions for the engine 102. If so, then at step 406, the method 400 further includes measuring at least one performance parameter associated with the engine 102 in which the at least one performance parameter includes the pair of values a, b corresponding with respective ones of the first and second banks of cylinders 104, 106 present on the engine 102.

Moreover, at step 408, the method 400 further includes determining a difference x in magnitude of the pair of values a, b for the at least one performance parameter. Thereafter, at step 410, the method 400 further includes computing at least one measure of variation for the at least one performance parameter using the difference x in the magnitude of the pair of values a, b for the at least one performance parameter. As disclosed earlier herein, in one embodiment, computing the mathematical and statistical measure of variation for the at least one performance parameter in a dynamic time segment includes computing a rolling standard deviation $\sigma$ using the difference x in the magnitude of the pair of values a, b for the at least one performance parameter over successive units of time in a total testing time period $T_1$.

At step 412, the method 400 further includes determining if the computed measure of variation for the at least one performance parameter exceeds a pre-defined limit for the engine. Additionally, at step 414, the method 400 also includes determining if the measure of variation persists above the pre-defined limit for the engine for the pre-defined period of time $T_2$. If so, then at step 416, the method 400 includes flagging the valvetrain as faulty.

Figure 5:
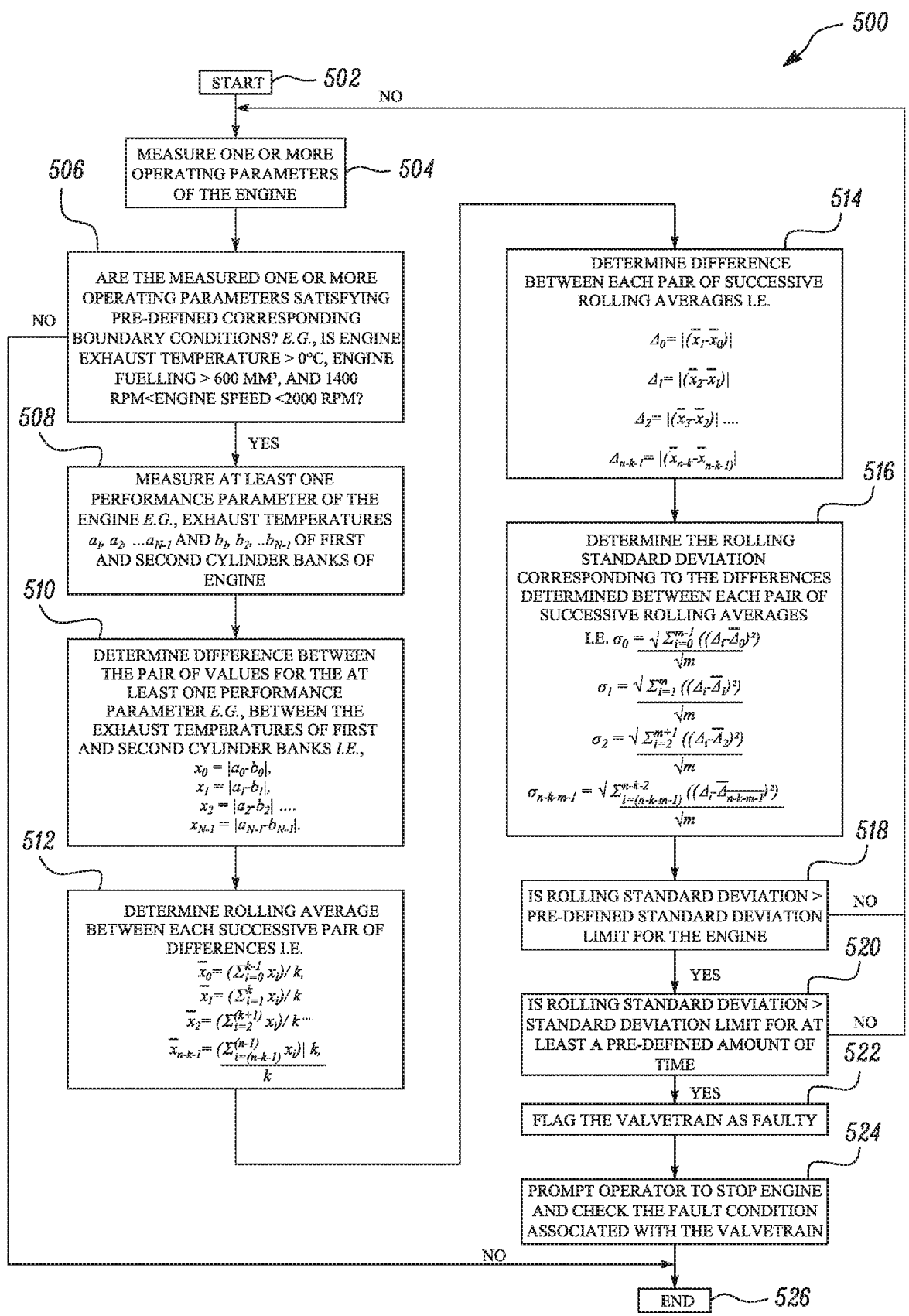
FIG. 5 is a process flowchart depicting an exemplary low-level implementation of the method from FIG. 4.

FIG. 5 is a flowchart of a process 500 depicting an exemplary low-level implementation of the method 400 from FIG. 4. The process 500 disclosed herein has been explained in conjunction with the rolling standard deviation $\sigma$. However, it should be noted that the process 500 can be similarly implemented using a different measure of variation in lieu of the rolling standard deviation $\sigma$ disclosed herein.

The process 500 initiates at step 502. At step 504, the one or more operating parameters of the engine 102 are measured. At step 506, the processor 126 determines if the one or more operating parameters of the engine 102 satisfy one or more pre-defined corresponding boundary operating conditions for the engine 102. If the measured operating parameters of the engine 102 do not satisfy the pre-defined corresponding boundary operating conditions for the engine 102, then the process 500 proceeds to step 524 at which the process 500 is terminated.

However, if the measured operating parameters of the engine 102 satisfy the pre-defined corresponding boundary operating conditions for the engine 102, then the process 500 proceeds to step 508 in which the processor 126 is configured to measure at least one performance parameter of the engine 102. Thereafter, at step 510, the processor 126 is configured to determine the difference x between each pair of measured values a, b for the at least one performance parameter (refer to eq. 1 disclosed earlier herein).

The process 500 continues from step 510 to step 512 in which the processor 126 is configured to determine the average $\bar{x}$ from each successive pair of differences x (refer to equations 2, 3, and 4 disclosed earlier herein). The process 500 then proceeds from step 512 to step 514 in which the processor 126 is configured to determine the difference $\Delta$ between each pair of successive averages $\bar{x}$ (refer to eq. 5 disclosed earlier herein). Thereafter, the process 500 then proceeds from step 514 to step 516 in which the processor 126 is configured to determine the rolling standard deviation $\sigma$ corresponding to the differences $\Delta$ determined between each pair of successive averages $\bar{x}$ (refer to equations 6 and 7 disclosed earlier herein).

Upon computing the rolling standard deviation $\sigma$, the process 500 proceeds from step 516 to step 518 in which the processor 126 is configured to determine if the rolling standard deviation $\sigma$ for the at least one performance parameter exceeds the pre-defined standard deviation limit $\sigma_{limit}$ for the engine 102. If the processor 126 determines that the rolling standard deviation $\sigma$ has not exceeded the pre-defined standard deviation limit $\sigma_{limit}$ for the engine 102, then the process 500 loops back from step 518 into step 504 for measurement of the operating parameters at a subsequent point in time.

However, if at step 518, the processor 126 determines that the rolling standard deviation $\sigma$ has exceeded the pre-defined standard deviation limit $\sigma_{limit}$ a for the engine 102, the process 500 proceeds from step 518 to step 520 in which the processor 126 additionally determines whether the rolling standard deviation $\sigma$ persists above the pre-defined standard deviation limit $\sigma_{limit}$ for at least the pre-defined amount of time $T_2$. If the processor 126 determines that the rolling standard deviation $\sigma$ has not exceeded the pre-defined standard deviation limit $\sigma_{limit}$ for at least the pre-defined amount of time $T_2$, then the process 500 loops back from step 520 into step 504 for measurement of the operating parameters.

However, if at step 520, the processor 126 determines that the rolling standard deviation $\sigma$ has exceeded the pre-defined standard deviation limit $\sigma_{limit}$ for at least the pre-defined amount of time $T_2$, the process 500 proceeds from step 520 to step 522 in which the processor 126 flags the valvetrain as being faulty. Thereafter, at step 524, the processor 126 may also prompt, via the indication device 128, to an operator of the engine 102 for stopping the engine 102 and checking the fault condition associated with the valvetrain. Also, upon flagging the valvetrain as faulty, the process 500 is terminated at step 526.

The present disclosure (i.e., the fault detection system 112, the method 400, the process 500, and any part(s) or function(s) thereof) may be implemented using hardware, software or a combination thereof, and may be implemented in one or more computer systems or other processing systems. Although the manipulations performed by the present disclosure were often referred to in terms such as detecting, determining, and the like, which are commonly associated with mental operations performed by a human operator, no such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for detecting a fault condition in an engine, and more particularly, with a valvetrain of the engine.

Numerous conventionally known methods for detecting a fault condition in the valvetrain use measured performance parameters directly in comparison with an average value. Such methods may be less reliable as spikes in the measured values of performance parameters may rapidly occur at any given point in time due to various factors that are not only difficult to instantaneously identify, rather, the spikes may also be intrinsic to various operating conditions of the engine. Moreover, many conventionally known methods rely on measurements from solely one performance parameter. Although use of measurements relating to a single performance parameter may suffice to facilitate the conventionally known detection strategies, a confidence level in such conventionally known detection strategies may be low enough to cause an inaccurate and/or unreliable detection of a fault condition in the valvetrain of the engine.

With use of embodiments disclosed herein, operators of engines may benefit in that whenever a fault condition occurs in the valvetrain of the engine, such fault condition is accurately and reliably detected to facilitate the operators in turning off the engine before further deterioration or failure of the associated valvetrains can occur. Moreover, as more and more performance parameters are included, albeit in their respective individual capacities, and their respective measure of variations are computed for comparison with respective pre-defined limits, the detection strategy of the present disclosure becomes robust in detecting a fault condition of the valvetrain.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fault detection system for an engine having a first bank of cylinders and a second bank of cylinders therein, the fault detection system comprising:
   a first plurality of sensors disposed on the engine,
      the first plurality of sensors being configured to measure one or more operating parameters of the engine;
   a second plurality of sensors disposed on the engine,
      the second plurality of sensors being configured to measure a pair of values for at least one performance parameter associated with the engine,
         wherein the pair of values for the at least one performance parameter correspond to respective measurements of the at least one performance parameter that are taken from each of the first bank of cylinders and the second bank of cylinders; and
   a processor communicably coupled to the first plurality of sensors and the second plurality of sensors,
      the processor being configured to:
         determine that the one or more operating parameters satisfy one or more corresponding boundary conditions for the engine;
         determine, based on determining that the one or more operating parameters satisfy the one or more corresponding boundary conditions, a difference in magnitude of the pair of values for the at least one performance parameter;
         compute, based on the difference in magnitude of the pair of values, a measure of variation of the at least one performance parameter in a time segment;
         determine that the measure of variation of the at least one performance parameter satisfies a limit for the engine;
         determine, based on determining that the measure of variation of the at least one performance parameter satisfies the limit for the engine, whether the measure of variation satisfies the limit, for the engine, for at least a particular period of time; and
         flag a valvetrain as faulty when the measure of variation satisfies the limit, for the engine, for at least the particular period of time.

2. The fault detection system of claim 1, wherein the one or more operating parameters include at least one of: engine speed, engine load, engine throttle position, engine fueling rate, or engine exhaust temperature.

3. The fault detection system of claim 1, wherein the at least one performance parameter includes at least one of: cylinder bank inlet temperature, cylinder bank exhaust temperature, cylinder bank inlet manifold pressure, turbine outlet temperature, or crankcase pressure.

4. The fault detection system of claim 1, wherein the measure of variation is a rolling standard deviation for the at least one performance parameter over successive units of time.

5. The fault detection system of claim 1, wherein the limit, for the engine, is a pre-defined standard deviation limit.

6. The fault detection system of claim 1, wherein, when determining whether the measure of variation satisfies the limit for the engine, the processor is configured to:
   determine whether a rolling standard deviation computed for the at least one performance parameter has exceeded a pre-defined standard deviation limit for at least the particular period of time.

7. The fault detection system of claim 1, wherein, when computing the measure of variation, the processor is configured to:
   determine an average of the difference in the magnitude of the pair of values over successive units of time;
   determine a difference between each pair of successive averages; and
   determine the measure of variation using the difference between each pair of successive averages.

8. The fault detection system of claim h further comprising:
   an indication device disposed in communication with the processor,
      wherein the indication device is configured to output a warning signal when the processor flags the valvetrain as faulty.

9. A method for detecting a fault condition of a valvetrain in an engine having a first bank of cylinders and a second bank of cylinders therein, the method comprising:
   measuring one or more operating parameters associated with the engine;
   determining that the one or more operating parameters satisfy one or more corresponding boundary conditions for the engine;
   measuring, based on determining that the one or more operating parameters satisfy the one or more corresponding boundary conditions, at least one performance parameter associated with the engine,
      wherein the at least one performance parameter includes a pair of values corresponding with respective ones of the first bank of cylinders and second banks of cylinders; and
   determining a difference in magnitude of the pair of values for the at least one performance parameter;
   computing a measure of variation for the at least one performance parameter in a time segment using the difference in the magnitude of the pair of values for the at least one performance parameter;
   determining that the measure of variation for the at least one performance parameter satisfies a limit for the engine;

determining, based on determining that the measure of variation of the at least one performance parameter satisfies the limit for the engine, whether the measure of variation satisfies the limit, for the engine, for at least a particular period of time; and flagging the valvetrain as faulty when the measure of variation satisfies the limit, for the engine, for at least the particular period of time.

10. The method of claim 9, wherein the one or more operating parameters include at least one of: engine speed, engine load, engine throttle position, engine fueling rate, or engine exhaust temperature.

11. The method of claim 9, wherein the at least one performance parameter includes at least one of: cylinder bank inlet temperature, cylinder bank exhaust temperature, cylinder bank inlet manifold pressure, turbine outlet temperature, or crankcase pressure.

12. The method of claim 9, wherein computing the measure of variation for the at least one performance parameter includes:

computing a rolling standard deviation using the difference in the magnitude of the pair of values for the at least one performance parameter over successive units of time.

13. The method of 9, wherein the limit, for the engine, is a pre-defined standard deviation limit.

14. The method of claim 9, wherein when determining whether the measure of variation persists above the limit, for the engine, comprises:

determining whether a rolling standard deviation computed for the at least one performance parameter has exceeded a pre-defined standard deviation limit for at least the particular period of time.

15. The method of claim 9, wherein computing the measure of variation includes:

determining an average of the difference in the magnitude of the pair of values over successive units of time;

determining a difference between each pair of successive averages; and determining the measure of variation using the difference between each pair of successive averages.

16. The method of claim 9, wherein the at least one performance parameter includes a pair of performance parameters.

17. An engine system comprising:

an engine comprising a first bank of cylinders and second bank of cylinders; and a fault detection system, the fault detection system comprising:

a first plurality of sensors disposed on the engine, the first plurality of sensors being configured to measure one or more operating parameters of the engine;

a second plurality of sensors disposed on the engine, the second plurality of sensors being configured to measure at least one performance parameter associated with the engine, wherein the at least one performance parameter includes a pair of values corresponding with respective ones of the first bank of cylinders and the second banks of cylinders; and a processor communicably coupled to the first plurality of sensors and the second plurality of sensors, the processor being configured to:

determine that the one or more operating parameters satisfy one or more corresponding boundary conditions for the engine;

determine, based on determining that the one or more operating parameters satisfy the one or more corresponding boundary conditions, a difference in magnitude of the pair of values for the at least one performance parameter;

compute a rolling standard deviation using the difference in the magnitude of the pair of values for the at least one performance parameter over successive units of time;

determine that the rolling standard deviation exceeds a pre-defined standard deviation limit for the engine;

determine, based on determining that the rolling standard deviation exceeds the pre-defined standard deviation limit for the engine, whether the rolling standard deviation persists above the pre-defined standard deviation limit for at least a particular period of time; and flag a valvetrain of the engine as faulty when the rolling standard deviation persists above the pre-defined standard deviation limit for at least the particular period of time.

18. The engine system of claim 17, wherein the one or more operating parameters include at least one of: engine speed, engine load, engine throttle position, engine fueling rate, or engine exhaust temperature.

19. The engine system of claim 17, wherein the at least one performance parameter includes at least one of: cylinder bank inlet temperature, cylinder bank exhaust temperature, cylinder bank inlet manifold pressure, turbine outlet temperature, or crankcase pressure.

20. The engine system of claim 17, wherein the at least one performance parameter includes a pair of performance parameters.

* * * * *